United States Patent Office 3,344,118
Patented Sept. 26, 1967

3,344,118
POLYAMIDE-FORMALDEHYDE CONDENSATE
Robert V. Smith, Racine, Wis., assignor, by mesne assignments, to Emery Industries, Inc., Cincinnati, Ohio, a corporation of Ohio
No Drawing. Filed Nov. 13, 1964, Ser. No. 411,112
5 Claims. (Cl. 260—51)

This invention relates to novel resinous condensates of formaldehyde and a phenol-amide-ester. More particularly, the phenol-amide-ester is the reaction product of 4,4-bis(hydroxyaryl)-pentanoic acid, dibasic acid and an alkanolamine. The resinous condensates are characterized by excellent flexibility and chemical resistance, as well as rapid cure.

Phenol-formaldehyde resins, in general, are known in the art and have been used extensively in protective coatings, molding powders, laminating resins, wire coatings and adhesives, primarily due to their outstanding resistance to deterioration upon exposure to organic solvents, dilute alkalies and acids and their low cost. In spite of this popularity, however, the unmodified or conventional phenol-formaldehyde resins are not suitable for many applications due to shortcomings, such as brittleness.

In an effort to overcome or compensate for the above limitations, extensive research has been performed in this area, with formulators of such resinous systems, finding it necessary to incorporate plasticizers into the phenol-formaldehyde condensates, or modify the basic resin structure by selecting phenols which have one or more alkyl chains substituted on the benzene nucleus. When the resins are physically plasticized, it is not always possible to obtain a completely compatible system without sacrificing other equally desirable properties, such as resistance to chemicals and/or solvent solubility. When modified phenols are employed in the condensate, a reactive site is removed from the phenols substantially influencing the curing characteristics of the condensates.

Substantial progress has been made in overcoming the disadvantages of modified systems by using select classes of phenols which will contribute internal plasticization to the final condensate. One such class of phenols are the 4,4-bis(hydroxyaryl)-pentanoic acid terminated polyamides. Condensates of these polyamides and formaldehyde are described in Bealor co-pending application Ser. No. 261,891, filed Feb. 28, 1963, entitled, "Novel Resins," and assigned to the assignee of the present invention. Although such systems overcome many of the disadvantages of conventional phenol-formaldehyde resins, including improved flexibility, it has now been discovered that the phenol-amide-esters prepared from 4,4-bis(hydroxyaryl)-pentanoic acid, dibasic acid, and an alkanolamine have decidedly superior properties from the standpoint of flexibility, hardness, color and solvent resistance. These improved properties enhance the use of the condensates as protective coatings.

The phenol-amide-esters of the instant invention are obtained by reacting 4,4-bis(hydroxyaryl)-pentanoic acid with a dibasic acid and an alkanolamine, employing conventional amidification-esterification methods, including direct heating at temperatures of from about 40–220° C. under conditions such that water produced during the condensation is continuously removed as it is formed. Since all of the reactants have boiling points higher than the amidification-esterification temperatures, no difficulty in removing the water of reaction is encountered.

Alternatively, it may be convenient to carry out the amidification-esterification reaction in the presence of water, initially forming an amine salt. The aqueous slurry is gradually heated to reflux and water removed until the optimum reaction temperature is reached. The water formed during the amidification-esterification can be removed by merely permitting it to volatilize, or removal may be facilitated by continuously bubbling a stream of inert gas, such as carbon dioxide or nitrogen, through the reaction mixture. It is also sometimes convenient to facilitate the water removal by carrying out the reaction in a vessel provided with a condenser attached through a water trap and adding a sufficient amount of a volatile, water-insoluble solvent to give reflux at the reaction temperature. The water is continuously removed by azeotropic distillation, permitting the solvent to return to the reaction mixture, after having dropped the water in a suitable trap. It may be desirable to at least partially react the dibasic acid and the alkanolamine prior to charging the bisphenolic acid.

The 4,4-bis(hydroxyaryl)-pentanoic acids which are used in making the phenol-amide-esters, employed herein, are described fully in Alfred R. Bader, U.S. Patent No. 2,933,520. Operable acids have the structural formula:

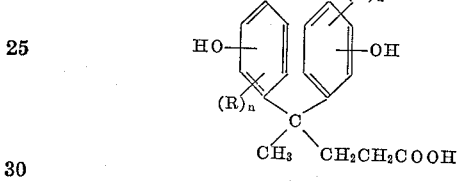

wherein R is a member of the group consisting of chloro, bromo, and lower alkyl. For purposes of this specification, "lower alkyl" embraces alkyl groups of from about 1–7 carbon atoms. "$n$" is a number selected from the group consisting of 0, 1, and 2, with the hydroxyl groups being attached to the 4 position of the ring structure when "$n$" is 0. These acids are conveniently prepared by reacting levulinic acid with a suitable phenol in the presence of a mineral acid with condensation occurring through the keto group of the levulinic acid. Other methods can be employed. Equivalent acids are those possessing a similar structure obtained by reacting a suitable phenol with an aldehyde-acid in place of the keto acid.

The dibasic acids which can be employed in the present invention are the aliphatic acids containing a straight hydrocarbon chain or the carbon atoms may be interrupted by ether-oxygen. Exemplary acids include succinic, azelaic, sebacic, diglycolic, and adipic. Primarily because of its commerical availability and the excellent properties of the final resinous condensates, adipic acid is preferred.

The amine employed in preparing the phenol-amide-esters according to the instant invention are the alkanolamines comprising a combination of aimne and hydroxyl functionality. Illustrative compounds include monoethanolamine, diglycolamine, and the longer chain polypropylene glycolamine. Although the aforesaid amines can be employed, it has been found that monoethanolamine is preferred primarily due to its exceptional reaction characteristics. Thus, a preferred phenol-amide-ester is obtained by reacting adipic acid, moncethanolamine, and 4,4-bis(hydroxyaryl)-pentanoic acid.

The ratio of the reactants in the preparation of the phenol-amide-esters is adjusted to terminate the amide-esters completely, or substantially completely, with 4,4-bis(hydroxyaryl)-pentanoic acid moieties. As is apparent, therefore, the alkanolamine can be used in slight excess to provide terminating amine or hydroxyl groups for reaction with the phenolic acid moiety. The preferred ratio is 3 mols dibasic acid, 4 mols alkanolamine, and 2 mols 4,4-bis(hydroxyaryl)-pentanoic acid. The resultant product employing the above ratio of reactants will have the approximate structure:

DPA—AoA(DA—AoA)$_n$DPA wherein DPA represents the 4,4-bis(4,hydroxyaryl)-pentanoic acid moiety, AoA the alkanolamine moiety, and DA the dibasic acid moiety. $n$ will have a value of 3. Variations in the ratio of reactants can be made to impart modifications in the characteristics of the final product by adjusting the reactants in order to change the value of $n$. Normally $n$ will have a value of 1–5. As is apparent, however, the critical feature is that the phenol-amide-ester be terminated with 4,4-bis(hydroxyaryl)-pentanoic acid moieties to provide a phenolic structure for reaction with formaldehyde.

The formaldehyde-phenol-amide-ester condensates are prepared by reacting the amide-ester with formaldehyde using processes known in the art. The reaction of the amide-ester with formaldehyde will proceed readily at temperatures of from about 30–140° C. without a catalyst. However, since the reaction under such conditions is quite slow, as a practical matter, either an acid or an alkaline catalyst is employed to accelerate the reaction. By choosing a specific catalyst, one can exercise some control over the type of product formed. For example, an acidic catalyst will provide a product containing methylene bridges directly, whereas an alkaline catalyst tends to form methylol groups initially, which groups are subsequently converted to methylene bridges upon application of heat. Acid catalysts which can be employed include formic acid, oxalic acid, sulfuric acid, para-toluene sulfonic, phosphoric and hydrochloric acid. In some instances, acid salts are desirable. Alkaline catalysts include sodium hydroxide, zinc hydroxide, ammonia, triethylamine and quaternary bases.

The reaction of formaldehyde with the phenol-amide-ester preferably is carried out in the presence of an organic solvent. At the completion of the reaction, the reaction charge is neutralized, if an excess of acid or alkali were employed, and subsequently washed. However, in many instances it is not necessary to neutralize the reaction mixture and the product can be used directly in the solvent medium in which it was prepared. The temperature of the reaction is not critical and depends to a substantial extent upon the reactants selected and the solvent employed as the reaction medium, as well as upon the nature of the catalyst. Thus, if relatively low, rather than high, temperatures are employed, the reaction takes a correspondingly longer time for completion. Although the reaction temperature is not considered critical, the reactions are preferably carried out at temperatures of from about 40–140° C. or at the reflux temperature of the charge. Organic solvents which are particularly desirable as the reaction medium include methanol, ethanol, butanol, isopropanol, benzene, toluene, and xylene.

Proportions of formaldehyde to the phenol-amide-ester can vary over a substantially broad range. Thus, in addition to the possible two active sites on each benzene nuclei of the pentanoic acid moiety, formaldehyde will react across the amide linkage. The added reactive site possibly accounts for the enhanced curing rate and for the exceptional resistance of the condensate to chemical attack. For each mol of phenol-amide-ester, up to 4 mols of formaldehyde can be employed for each pentanoic acid moiety, and an addiitonal mol for each mol of alkanolamine. As will be apparent, the greater the amount of formaldehyde in the resinous condensate, the greater the complexity of the resultant condensate and the more rapid will be the conversion characteristics.

Formaldehyde can be supplied to the reaction medium in any of the known commercial forms. Thus, if the reaction is to be carried out in an organic medium, butyl formal, sec.-butyl formal, propyl formal, ethyl formal and methyl formal can be selected. Additionally, other commercial sources of formaldehyde such as para-formaldehyde and trioxane can be used.

Having described the invention in general terms, the following examples will particularly illustrate preferred embodiments. Examples I and II describe the preparation of the phenol-amide-ester and Examples III, IV and V illustrate the preparation of the formaldehyde condensate employing the amide ester of Example I. Examples IV–VI demonstrate the utility of the condensates when converted to thermoset films. Softening points were determined by the ring and ball method, described in American Society of Testing Materials, E28–48T. Acid values, as used herein, represent the number of milligrams of KOH required to neutralize a one gram sample. Amine values represent the number of milligrams of KOH equivalent to the free amine content of a one gram sample. The amine and acid values were determined by visual or electrometric titrations. Parts are by weight unless otherwise indicated.

*Example I*

657 parts (4.50 mols) adipic acid, 366 parts (6.00 mols) monoethanolamine and 105 cc. xylene were charged to a three neck flask equipped with agitator, thermometer, and side arm water trap. The temperature was raised slowly to 100° C. and the addition of 858 parts (3.00 mols) 4,4-bis (4-hydroxyphenyl) pentanoic acid was commenced. All of the 4,4-bis(4-hydroxyphenyl) pentanoic acid was added over a period of about 25 minutes. The temperature is then raised, with good agitation, until water starts to distill over, which is about 130° C. From this time on the temperature is controlled by the rate at which water is removed and the amount of xylene in the reaction. The temperature was increased slowly to a maximum of 175° C. while removing water of reaction and xylene, until an acid value of approximately 33 and an amine value of about 2 was obtained. The total reaction time is about 8.5 hours. The product, totaling 1600 grams is an amber, resinous material having a ring and ball softening point of 85° C. A 45 percent solution of the resin in 3A alcohol has a Gardner viscosity of A–1 and a color of 5–6.

*Example II*

415 parts (2.84 mols) adipic acid, 215 parts (3.52 mols) monoethanolamine, and 55 parts of xylene were charged to a 2 liter flask equipped with agitation, inert gas sparge, thermometer and water trap. The ingredients were heated to 100° C. (agitation is started as soon as practical) and 407.5 parts (1.43 mols) of 4,4-bis(4-hydroxyphenyl) pentanoic acid are added slowly. Inert gas rate is set at 2 liter per minute. The temperature is raised, with water starting to distill over at 135° C. Over a 7 hour period, the temperature is gradually raised and held at 180° C. maximum until the acid value is below 32. The reaction product was cast in a shallow tray. Final constants are acid value 27.4; amine value 2.25; and ring and ball softening point 85° C. The resin when cut in 3A alcohol to 45 percent N.V. had a Gardner viscosity of A and a color of 5–6.

*Example III*

1200 parts of the amide-ester of Example I and 648 parts 40 percent butyl formcel were charged to a three neck flask fitted with a water jacket condenser, stirrer, and thermometer. 7.32 parts of 85 percent phosphoric acid catalyst are added with 120 parts butanol before raising the temperature to reflux. The charge is refluxed for a total of six hours to provide a viscous, amber colored liquid at 50 percent nonvolatile in butanol. The product contains 5.61 percent free formaldehyde, has a Gardner viscosity of Z–7, percent N.V. of 76.2 and the final acid value of the solids was 29.3.

Example IV 1000 parts of the product of Example II, 478 parts butyl formcel, 5.35 parts of 85 percent phosphoric acid, and 108 parts of n-butanol are charged to a 2 liter flask equipped with agitation, thermometer, and reflux condenser. Reaction is heated to reflux temperature (105–108° C.) and held for six hours. The final product has a viscosity of Z–5+ at 71.1 percent N.V.

Example V

A thin film, having a wet thickness of 0.5–0.6 mil, of the product of Example III, was spread on a steel panel and baked for 15 minutes at 400° F. The baked film was extremely hard, possessed good impact resistance and had excellent flexibility. The film when immersed in acetone for a period of 2 minutes did not soften. Upon immersion in acetone for a period of approximately 20 hours, the film, while losing some of its initial hardness, was still continuous and provided a good protective coating.

Example VI

A thin film of the product of Example IV, having a dry thickness of 0.4–0.6 mil, was spread on a steel panel and baked for 15 minutes at 400° F. to give a tough insoluble and infusible coating. The film had good hardness and impact resistance. Upon immersion in acetone for 2 minutes, the film did not lose its initial hardness and showed no effect upon exposure to boiling water for a period of two hours.

Example VII

The condensate of Example III was modified with 1 percent polyvinyl butyral and thereafter thin films of the product were spread on steel panels and baked for 15 minutes at 400° F. to give tough, infusible, and insoluble coatings. The films had good initial hardness and did not lose their hardness after being immersed in acetone for 2 minutes.

In Example I, the 4,4-bis(4-hydroxyphenyl) pentanoic acid can be replaced by disphenolic acids containing chloro, bromo, and alkyl groups of from 1 to 7 carbon atoms including 4,4 - bis(4 - hydroxy - 3 - ethyl - phenyl) pentanoic acid, 4,4 - bis(4 - hydroxy - 2 - ethyl - phenyl) pentanoic acid, 4,4 - bis(4 - hydroxy - 3 - butyl - phenyl) pentanoic acid, 4,4 - bis(4 - hydroxy - 3 - amyl - phenyl) pentanoic acid.

The formaldehyde condensates disclosed herein have excellent utility as protective coatings, adhesives and molding powders, as the sole resinous material. Additionally, the materials can be modified, or used to modify other resinous systems including vinyl type polymers, polyepoxide resins, and the more conventional urea and melamine-formaldehyde and phenol-formaldehyde resins. When used as modifiers the amide-ester-formaldehyde condensates contribute superior plasticity and compatibility as well as in many instances superior curing properties and chemical resistance. The resins both modified and unmodified find application in interior coatings of sheet metal containers and as plasticizers in many polymer systems. The plasticized films are clear, transparent and relatively stable to high boiling materials. The condensates when used to modify polyepoxide resins contribute excellent corrosion and chemical resistant properties.

While various modifications of this invention have been described, it should be understood that the invention is not restricted thereto, and that it is intended to cover all modifications of the invention which would be apparent to one skilled in the art and which come within the scope of the appended claims.

What is claimed and desired to secure by Letters Patent:

1. The resinous polymeric condensation products of formaldehyde and a 4,4-bis(hydroxyaryl) pentanoic acid terminated amide-ester, said amide-ester being the reaction product of dibasic acid, an alkanolamine and substantially completely terminated with 4,4-bis(hydroxyaryl) pentanoic acid, said pentanoic acid having the structure:

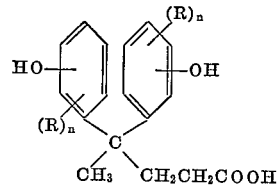

wherein R is a member of the group consisting of lower alkyl, and $n$ is a number selected from the group consisting of 0, 1, and 2, with the hydroxyl groups being attached to the 4 position of the ring structure when $n$ is 0.

2. The resinous polymeric condensation product of claim 1, wherein the pentanoic acid is 4,4-bis(4-hydroxyphenyl) pentanoic acid, the dibasic acid is adipic acid and the alkanolamine is monoethanolamine.

3. The resinous polymeric condensation product of claim 2, wherein from 0.5 to 4 mols of formaldehyde are present for each pentanoic acid moiety.

4. The composition of claim 1 wherein said alkanolamine is a monoalkanolamine.

5. The composition of claim 4 wherein said alkanolamine is monoethanolamine.

References Cited

UNITED STATES PATENTS

| | | | |
|---|---|---|---|
| 2,907,728 | 10/1959 | Greenlee | 260—19 |
| 2,933,520 | 4/1960 | Bader | 260—473 |

FOREIGN PATENTS

| | | |
|---|---|---|
| 790,373 | 2/1958 | Great Britain. |

WILLIAM H. SHORT, *Primary Examiner.*

H. SCHAIN, *Assistant Examiner.*